United States Patent Office.

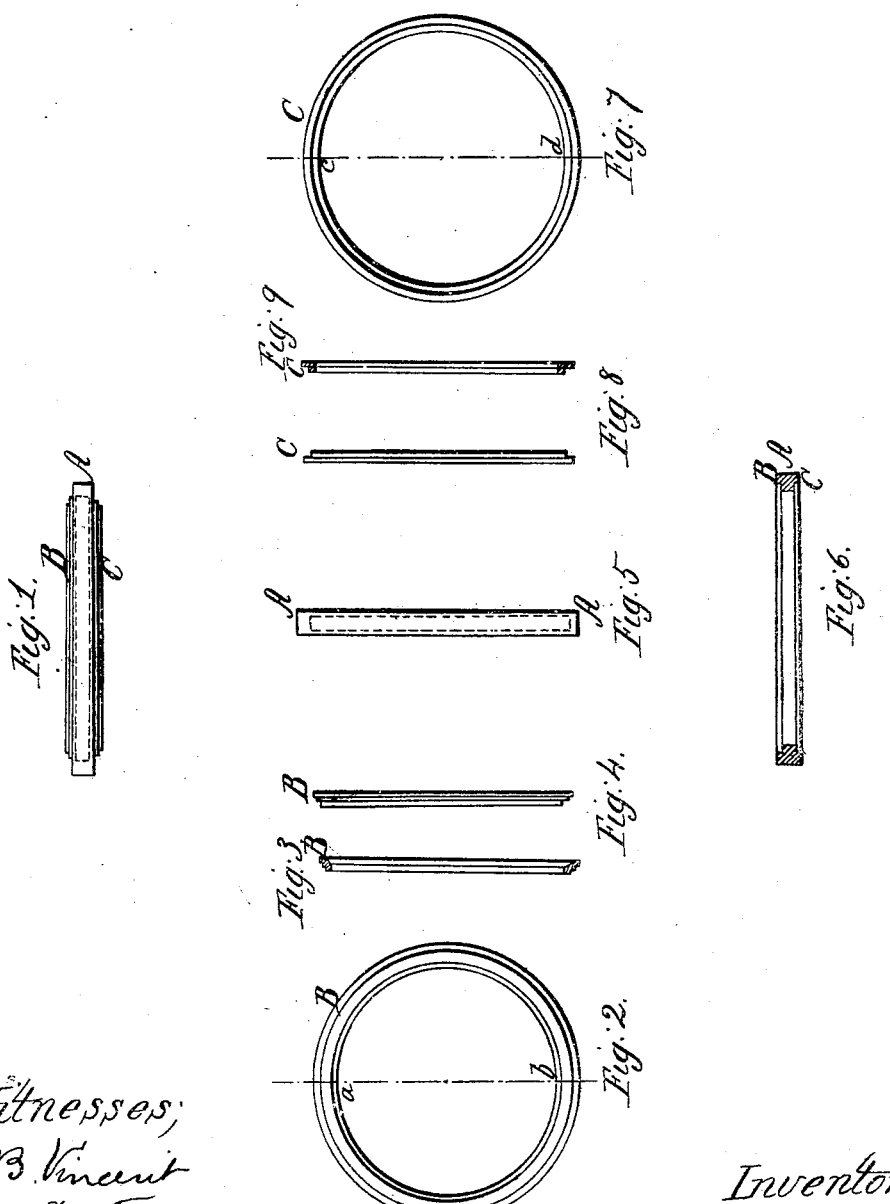

GEORGE W. LADD, OF PROVIDENCE, RHODE ISLAND, ASSIGNOR TO JOHN A. BROWN, OF SAME PLACE.

*Letters Patent No. 65,579, dated June 11, 1867.*

IMPROVED METHOD OF MAKING SIDE BANDS OF WATCH-CASES.

*The Schedule referred to in these Letters Patent and making part of the same.*

TO ALL WHOM IT MAY CONCERN:

Be it known that I, GEORGE W. LADD, of the city and county of Providence, in the State of Rhode Island, have invented certain new and useful Improvements in the Method of Making the Side Bands of Watch-Cases; and I do hereby declare that the following specification, taken in connection with the drawings making a part of the same, is a full, clear, and exact description thereof.

Figure 1 is an edge view of the side band of a watch-case.

Figures 2 to 9, inclusive, are different views of the parts of which it is composed.

The side band of a watch-case is that part to which the halves or lids are hinged, and which halves when attached to the side band make up the entire case.

The side band is made up of three parts, a central portion, A, fig. 5, and two rims B and C, figs. 4 and 8, one on each side of A, upon which are the sharp grooves into which the bevel or snapping edge of the respective lids springs when the case is shut. It is customary to finish the central band A with a milled surface, or otherwise ornament it, by the application of a revolving steel die pressed apainst the band while the latter held upon a mandrel is revolving in a lathe. Heretofore these side bands have been made with their accompanying rims B and C by striking up from sheet metal, by means of suitable dies, each of the rims with one-half of the centre band A in one piece, and then soldering two halves so made together, the joint in such case being in a plane midway between the edges of the band A. When side bands so made are milled, or otherwise ornamented as above described, the effect is to stretch the metal of the central portion A, and consequently wring out of shape the rims B and C so that it is a matter of some difficulty, and requiring much time and patience, to fit the lids or cases accurately thereto and make a nice joint when the case is closed. I propose to overcome this difficulty by constructing the side band in three distinct parts, consisting of a centre band A, fig. 5, and the side rims B and C, figs. 2, 4, 8, and 7. Each of these parts is formed from wire of the appropriate size, then bent in a hoop and soldered at the joint. Each part should then be formed into shape by means of dies, and instead of making the rims B and C of the same diameter as the central band A, they should be as much smaller as the band will stretch during the milling operation. After the band has been milled and trued off in the lathe the rims are then to be soldered to its sides.

The advantages which result from the method of making the article are not only that the halves of the cases can be fitted with accuracy and dispatch to the side band, and make, when sprung into place by closing the case, perfect joints, but metal of different qualities and grades of fineness can be used for the parts of the side band; as, for example, the central portion A which is exposed to view can be made of gold or silver, while the rims B and C may be made of a harder and cheaper composition metal.

What I claim as my invention, and desire to secure by Letters Patent, is—

The method of constructing the side band for watch-cases, substantially as herein described for the purpose specified.

GEORGE W. LADD.

Witnesses:
W. B. VINCENT,
J. D. THURSTON.